United States Patent
Jarvis et al.

(10) Patent No.: US 9,658,313 B2
(45) Date of Patent: May 23, 2017

(54) TERRESTRIAL POSITIONING ASSISTANCE SERVING BASED ON RECEIVER DEVICE CONTEXT

(71) Applicant: QUALCOMM TECHNOLOGIES INTERNATIONAL, LTD., Cambridge (GB)

(72) Inventors: Murray Robert Jarvis, Stapleford (GB); James Burgess Tidd, Stockholme (SE)

(73) Assignee: QUALCOMM TECHNOLOGIES INTERNATIONAL, LTD., San Diego, CA (US)

( * ) Notice: Subject to any disclaimer, the term of this patent is extended or adjusted under 35 U.S.C. 154(b) by 881 days.

(21) Appl. No.: 13/912,352

(22) Filed: Jun. 7, 2013

(65) Prior Publication Data
US 2014/0361927 A1    Dec. 11, 2014

(51) Int. Cl.
*G01S 5/02* (2010.01)
*H04W 64/00* (2009.01)

(52) U.S. Cl.
CPC .......... *G01S 5/0294* (2013.01); *G01S 5/0242* (2013.01); *G01S 5/0252* (2013.01); *H04W 64/00* (2013.01)

(58) Field of Classification Search
USPC .............. 342/357.21, 451, 457, 463–465; 701/468, 517
See application file for complete search history.

(56) References Cited

U.S. PATENT DOCUMENTS

| | | |
|---|---|---|
| 8,385,943 B1 | 2/2013 | Han et al. |
| 8,532,676 B1 | 9/2013 | El-Sallabi |
| 2005/0037775 A1* | 2/2005 | Moeglein ............ G01S 5/0036 455/456.1 |
| 2005/0176441 A1 | 8/2005 | Jurecka |

(Continued)

FOREIGN PATENT DOCUMENTS

| | | |
|---|---|---|
| WO | WO 2011/127005 | 10/2011 |
| WO | WO 2014/039061 | 3/2014 |

OTHER PUBLICATIONS

GB Search Report issued in related GB Appln. No. 1406116.2, dated Sep. 26, 2014.

*Primary Examiner* — Dao Phan
(74) *Attorney, Agent, or Firm* — The Marbury Law Group, PLLC

(57) ABSTRACT

A method and apparatus for harvesting information from a plurality of radio frequency (RF) sources. In one example, a collector device receives RF signals from the RF sources to produce the harvesting information. The collector device also determines environmental context information describing a physical environment of the collector device as the RF signals were being received, and a position of the collector device where the RF signals where received. The collector device then associates the environmental context information with the harvesting information and the position, and transmits the harvesting information and position with the associated environmental context information to a server device. The server device may then compute positioning information biased to different environmental contexts. This biased positioning information may then be utilized by other collector devices having similar environmental contexts to better estimate their respective locations.

16 Claims, 7 Drawing Sheets

(56) References Cited

U.S. PATENT DOCUMENTS

2012/0056785 A1    3/2012   Jovicic et al.
2013/0035110 A1    2/2013   Sridhara et al.
2013/0162481 A1    6/2013   Parvizi et al.

* cited by examiner

TERRESTRIAL POSITIONING ASSISTANCE SERVING BASED ON RECEIVER DEVICE CONTEXT

The present invention is directed to a system and a method for aiding the location determination of collector devices. Specifically, the environmental context (e.g. user dynamic context) of the collector device is used to calculate and utilize access point locations or RF fingerprints more effectively.

BACKGROUND

In some situations, it is desirable to know radio frequency (RF) signals expected to be received from the wireless transmitters (i.e. access points) in a given location in order to estimate locations of mobile devices. RF signals transmitted from, for example, Wi-Fi access points may be harvested (i.e. RF scan information is received and associated with absolute or relative position information of the mobile device) by mobile devices (i.e. collector devices) that are traveling through an environment using different modes of transportation (e.g. walking, driving, etc.), and are then used to estimate the locations of the mobile devices.

SUMMARY

A method and apparatus for harvesting information from a plurality of radio frequency (RF) sources. In one example, a collector device receives RF signals from the RF sources to produce the harvesting information. The collector device also determines environmental context information describing a physical environment of the collector device as the RF signals were being received, and a position (absolute or relative) of the collector device. The collector device then associates the environmental context information with the harvesting information and position, and transmits the harvesting information, position and the associated environmental context information to a server device. The server device may then compute positioning information for different environmental contexts (i.e. biased positioning information such as biased AP locations or biased RF fingerprints). This positioning information may then be utilized by other collector devices to better estimate their locations.

BRIEF DESCRIPTION OF THE DRAWINGS

The invention is best understood from the following detailed description when read in connection with the accompanying drawings, with like elements having the same reference numerals. This emphasizes that according to common practice, the various features of the drawings are not drawn to scale. On the contrary, the dimensions of the various features are arbitrarily expanded or reduced for clarity. Included in the drawings are the following figures.

DETAILED DESCRIPTION OF THE INVENTION

Figure 1A:
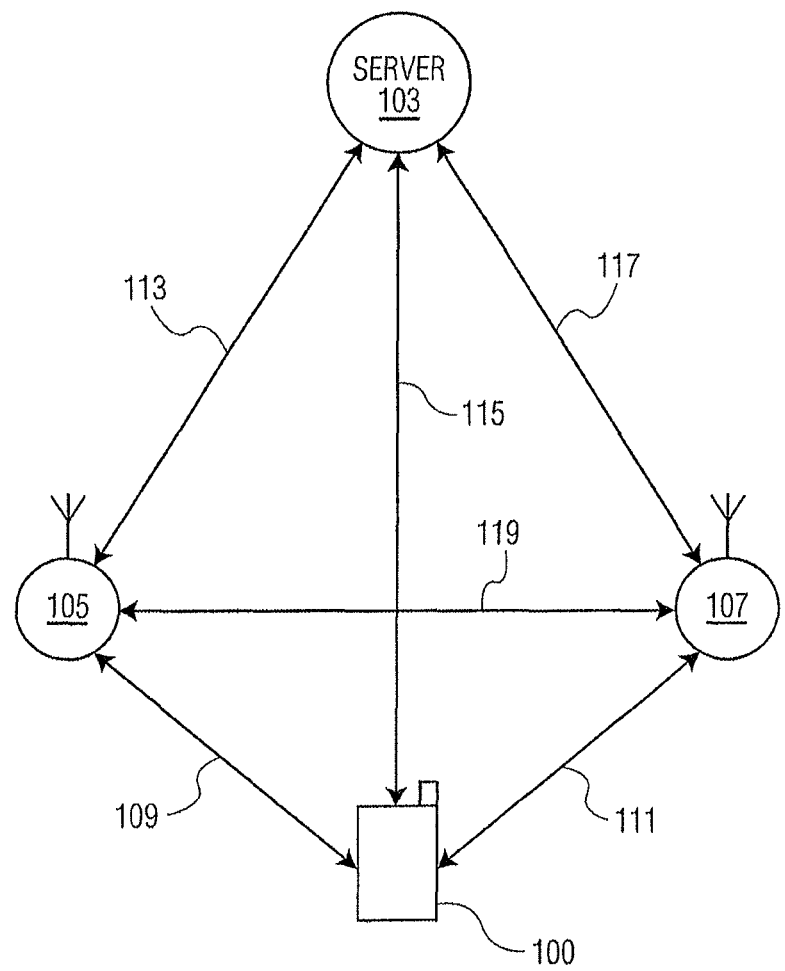
FIG. 1A is a block diagram showing communication between a collector device, access points and a server, according to an embodiment of the present invention.

FIG. 1A shows an example of a communication network including collector device 100, access points (APs) 105 and 107 and centralized server 103. In general, these devices communicate with each other via communication paths 109, 111, 113, 115, 117 and 119 respectively. Although only one collector device, one server and two APs are shown, it is contemplated that the communication network could include a plurality of collector devices, a plurality of APs and a plurality of servers.

It is also noted that paths 113, 115 and 117 may be optional in embodiments where server 103 is not utilized. Furthermore, paths 109 and 111 may also be uni-directional in embodiments where device 100 receives signals from the APs but does not transmit signals to the APs.

In general, collector device 100 (e.g. a mobile telephone) travels in proximity to APs 105 and 107 (e.g. Wi-Fi APs that provide access to other devices, computers and severs over local networks and the internet). Collector device 100 attempts to estimate its location based on its previously known location and signals received from APs 105 and 107 and signals generated by internal sensors.

In one example, collector device 100 may measure received signal strengths from RF signals transmitted by the APs. These measurements along with other measurements from other access devices and from motion and environmental sensors may then be transmitted to centralized server 103 which estimates the absolute positions of the APs. This process of determining the absolute locations of the APs is known as relative harvesting, and is described in co-pending U.S. application Ser. No. 13/533,349 entitled "ACCESS POINT LOCATION IDENTIFICATION METHODS AND APPARATUS BASED ON ABSOLUTE AND RELATIVE HARVESTING" which is incorporated herein by reference.

In one example, collector device 100 may monitor RF signals transmitted by multiple APs (e.g., Wi-Fi and/or other RF transmitters). The collector device 100 may then identify each of the APs. As collector device 100 travels along a path, its location may be estimated using pedestrian dead reckoning (PDR). In one example, PDR is implemented by computing a relative displacement from an initially known location to other estimated locations along the path. Displacement between the locations may be estimated based on various measurements of the transmitted AP RF signals (e.g.

received signal strength indication (RSSI), time or phase offsets of received signals and/or round trip delay time (RTT)).

In general, data collection by collector device 100 may be performed at various points along the path and then transmitted from collector device 100 to server 103 (i.e. displacement information, signal strength information and identification information may be transmitted to the server). Server 103 may then process this received data to estimate the absolute locations of the APs along the path.

In one example, collector device 100 may be traveling along a path within a building. In the building, wireless APs may be transmitting RF signals. Collector device 100, at various locations along a path, monitors the received RF signals transmitted from the APs. By using the various measurements described above collector device 100 is able to compute a displacement between the various locations along the path based on an initially known absolute location (i.e. an anchor). In one example, the anchor could be the last computed absolute position of collector device 100 (e.g. the last global navigation satellite system (GNSS) fix before entering the building).

Collector device 100 may then transmit the collected data (i.e. displacement information, signal strength information and identification information) to server 103. Server 103 may then compute the absolute positions of the APs in an attempt to map the overall positioning network. These absolute positions of the APs are then transmitted to collector device 100 and other collector devices in the network. Collector device 100 may then use the absolute locations of the APs to more accurately estimate its current location (i.e. RF signal strength received from the AP as well as the absolute AP location computed by the server could be used to estimate the absolute location of the collector device). It is noted that collector device 100 may be capable of performing both harvesting and positioning either simultaneously or at different times. In other examples, collector device 100 may be capable of performing harvesting, or positioning separately.

Based on the absolute position information obtained when the collector device 100 was at the last GNSS fix, the signal characteristic measurements at the points along the path and the displacement measurements, the server 103 can estimate locations for the points along the path. Using these positions, the server 103 can then estimate the positions of the APs by performing respective weighted centroid calculations using the signal characteristic measurements at the points along the path. Thus, it may obtain an estimate of the relative positions of the APs. It is noted that, according to one example embodiment, these centroid measurements are not used as the locations of the APs but are merely starting points for a calculation that estimates the position more accurately, based on crowd-sourced information. The calculated positions of the points along the path as well as the centroid positions of APs are only estimates because, for example, the collectors device 100 may not always have a clear signal path to the APs so the signal characteristic at one or more of the points along the path may be attenuated. In addition, if RTT or arrival time is used as a signal characteristic, the value calculated by the collector device 100 may be erroneous due to multipath. Furthermore, the sensor data for a particular device may not be properly calibrated. Crowd-sourcing is used as described below, to refine these estimates by combining multiple estimates from multiple collector devices 100, taken at different times and different locations.

In an example embodiment, estimating the AP location is formulated as a cost function minimization (which can be mapped to Maximum Likelihood) based on two terms. The first term is a sum over every Wi-Fi observation. This locates the APs in the regions having signal characteristics with high confidence levels. The second term ensures that the estimated true locations where the scans were made do not violate the constraints imposed by the absolute and relative harvesting. It is a sum over all the constraints present. The cost function is shown in Equation (1):

$$E = \Sigma_n (\underline{A}_{i[n]} - \underline{U}_{j[n]})^2 w^2(\text{RSSI}_n) + \Sigma_c (U_{k[c]} - \delta_{c,R} \underline{U}_{l[c]} - \Delta_c)^T \Sigma_c^{-1} (\underline{U}_{k[c]} - \delta_{c,R} \underline{U}_{l[c]} - \Delta_c) \quad (1)$$

Where: $\underline{U}$ is the estimated location (e.g. x,y,z vector) at which a scan observation was made (i.e. an estimated location of a collector device 104); $\underline{A}$ is the estimated position of an AP; n is a sum over all observations of APs; c is a sum over all constraints; $\delta_{c,R}$ selects presence or absence of this variable according to whether the constraint is relative or absolute (e.g. Kronecker delta); $\Delta_c$, for absolute constraints, is the measured location and for relative constraint is the measured delta; i[n],j[n],k[c],l[c] are mappings from the observations and constraints to the relevant locations of the APs and points where the collector devices made the observations (i.e. A's and U's); $w^2(\text{RSSI}_n)$ is a weighting for an observation, which may be, for example a function of the signal strength (RSSI) of the monitored AP signal; $\Sigma^{-1}$ is a weighting for a constraint (in the example, this is a 3×3 matrix for each constraint); and T is the transpose of the vector. If RTT or some other measure of signal timing were used as a characteristic of the APs, an additional term may be added to the cost function to accommodate the variation in signal timing.

The above example cost function contains three variables for three unknown AP locations and three for each unknown collector device position at which a scan was obtained. Typically this is therefore a minimization problem with hundreds, or thousands of unknowns. It is nevertheless tractable as the cost function and gradient are straightforward to calculate.

It is desirable to start the minimization from a good initial point. This may be obtained, for example, using the weighted centroids, described above, to obtain initial estimates of the AP locations and/or by iteratively solving sub-parts of the above problem. Additional outlier rejection checks may be applied at this stage based on the estimated locations obtained from the initial seed calculation.

The example cost function does not use the strictly quadratic (and consequently implied Gaussian) form above but may moderate its form for large errors by changing from quadratic to linear and then constant as the error increases. This process known is known as fat-tailing and flat-tailing.

Uncertainty (equivalently confidence/covariance) in the solution is obtained from the curvature of the cost function at the minimum. The Hessian matrix can be evaluated at the cost function minimum and its inverse yields the covariance matrix. Due to the large number of dimensions this may be an expensive operation. This may be addressed by exploiting the dominantly local nature of the contributors (effectively the sparseness of the matrix) to allow the problem to be split into a series of smaller computationally cheaper calculations, each using a respective portion of the matrix.

Fingerprinting is a method that uses a model of the propagation pattern of each AP 105 and 107 to estimate the likely location of a collector device 100. If the fingerprint of an AP were used as its positioning data, the model may be initialized with estimated position points in the area and their corresponding signal characteristic measurements. The cost function described above in equation (1) may be modified to minimize differences between the observations and the fingerprint model.

If additional anchors (i.e. absolute positions other than the last known GNSS fix) within the building are able to be determined by collector device 100, then the overall accuracy of the harvesting would increase since these absolute positions could be included in the above described cost function. One way to determine additional anchors within the building is to utilize map information. In general, information of the architectural layout of the building (which is already known) may be utilized by server 103 in order to more accurately estimate the location of collector device 100 and the locations of the APs.

Figure 1B:
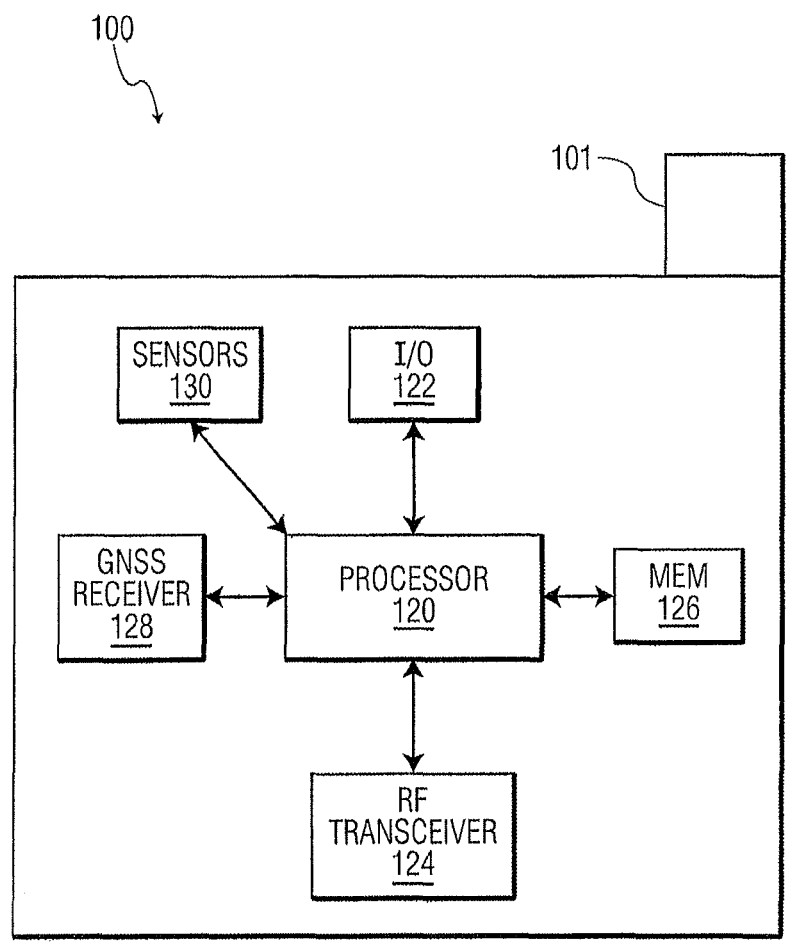
FIG. 1B is a block diagram of a collector device, according to an embodiment of the present invention.

FIG. 1B shows an example of collector device 100 which may be embodied as a mobile device (e.g. a mobile telephone). Collector device 100 may include a processor 120 for controlling various other hardware or software modules. In one example, collector device 100 may include input and output devices (i.e., keypad and display, not shown), memory 126, RF transceiver device 124 (e.g. Wi-Fi transceiver), a global navigation satellite system (GNSS) receiver 128, and internal sensors 130 (e.g. of an accelerometer, gyroscope, pedometer, barometer, magnetometer, microphone and camera).

In one example, the RF transceiver 124 may be able to transmit and receive in various IEEE 802.11 standards. The GNSS receiver 128 may also be able to receive satellite signals, for example, from GNSS satellites. Both the GNSS receiver and the RF transceiver 124 may utilize antenna 101 which may be a common antenna or separate dedicated antennas for transmitting and receiving in specific frequency bands.

In one embodiment, collector device 100 may utilize internal sensors in order to determine environmental context of the collector device. It is noted that environmental context may include information about the environment of the collector device and/or information about the mode of travel (i.e. user dynamic context) of the collector device (e.g. if the collector device 100 is indoors/outdoors, traveling up a staircase, traveling in an elevator, walking, traveling in a vehicle, etc.). Once the environmental and user dynamic context information has been determined, collector device 100 may then transmit this information to server 103. Server 103 may then adjust (i.e. correct) the locations of the APs based on map information. For example, the known locations (e.g. latitude and longitude) of the stairs, elevator, etc. may be used by the server device 103 as anchors in determining the locations of the APs.

Figure 1C:
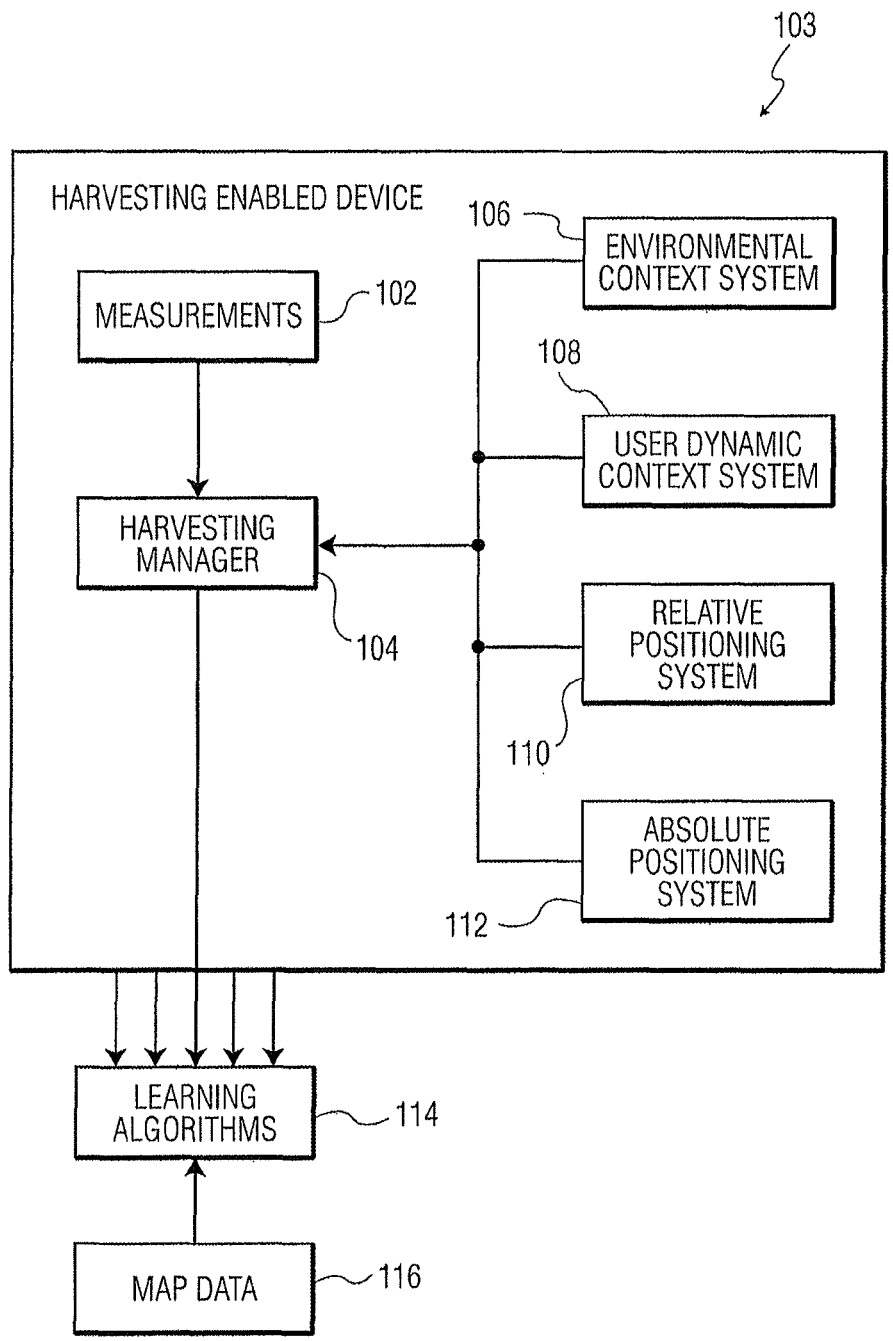
FIG. 1C is a block diagram of a processor in the server device, according to an embodiment of the present invention.

An example embodiment of server 103 is shown in FIG. 1C where hardware and/or software modules may be implemented to estimate the locations of the APs. Specifically, processor 120 may have module 102 for processing the measurements received from the internal sensors of collector device 100, environmental context system 106 for determining environmental context of the device (e.g., whether the device is indoors or outdoors), user dynamic context system 108 for determining traveling dynamics of the user (e.g., whether the user is traveling upstairs, in an elevator, in a vehicle, etc.), relative positioning system 110 for determining the relative position to the APs from the collected measurements and context data, absolute positioning system 112 for estimating the absolute position, for example, based on the GNSS signals, harvesting manager 104 which estimates the locations of the APs, learning algorithm module 114 which combines the harvesting information with the map information from map data module 116 in an attempt to correct the locations of the APs. Although the server device 103 is shown as being separate from collector device 100, it is contemplated that collector device 100 could perform all of the functions of server device 103.

In one example, harvesting manager 104 may estimate locations for a plurality of APs within a building. In order to obtain a better estimate of the AP locations, the learning algorithm may correlate the environmental and user dynamic context information that has been determined within the building with associated map data that may be used as an anchor within the building.

For example, measurement module 102 may receive accelerometer measurements from collector device 100 indicating that collector device 100 is accelerating in a vertical direction. The environmental and user dynamic context modules 106 and 108 may then determine that the user is riding in an elevator within the building. The learning algorithm may then utilize this environmental and user context information to extract specific map data (i.e., the latitude and longitude) of the elevator which may be known due to architectural drawings of the building. Learning algorithm module 114 may then utilize this map information to adjust the estimated locations of the APs relative to the newly found absolute anchor position within the building. If multiple elevators are present, the learning algorithm may utilize the elevator closest to the estimated position. This process of using environmental and user dynamic context to adjust estimated AP locations is described in co-pending U.S. application Ser. No. 13/606,172 entitled "CONTEXT AND MAP AIDING FOR SELF-LEARNING" which is incorporated herein by reference. It is noted that the above described learning algorithm is one example of a learning algorithm. Other learning algorithms may also be utilized by the system.

In general, collector devices may collect data in various different methods such as war driving, survey and crowd sourcing. War driving is when a collector device drives through an area of interest and records terrestrial signals from APs along with an associated GNSS position (i.e. the position where the signal was received). Survey is when the data is input from a map or a manual process of indicating the positions of the measurements sent. Crowd sourcing is when harvesting information is collected opportunistically from devices which may have different purposes.

When data is harvested by the collector devices, the data is typically biased towards the environmental context (e.g. mode of travel) of the respective collector device. For example, if a collector device is located in a vehicle, then the collector device may be receiving AP signals from the perspective of the roadways on which the vehicle is traveling. In contrast, when the collector device is located on a pedestrian, then the collector device may receive AP signals from the perspective of pedestrian walkways and other pedestrian areas.

Mixing received access point signals harvested from while traveling in different modes of transportation can lead to inaccurate results. For example, signals harvested by way of walking may lead to user positions biased towards pedestrian locations (e.g. walkways), whereas signals harvested by way of driving may be biased towards vehicle locations (e.g. roadways). It may be beneficial to segregate harvested signals based on the mode of transportation during the harvesting, such that position solutions are biased for a particular mode of transportation.

Although there are numerous other examples of environmental contexts in which collector devices may be collecting data from APs (traveling by: bicycle, boat, train, plane, elevator, etc.), the following description utilizes an example of a collector device in a vehicle, and a collector device on a pedestrian walking (for illustration purposes). These two modes of travel are only meant to be examples, and it is contemplated that other environmental contexts (e.g. other modes of travel) in general may also lead to biased AP signals.

Figure 2A:
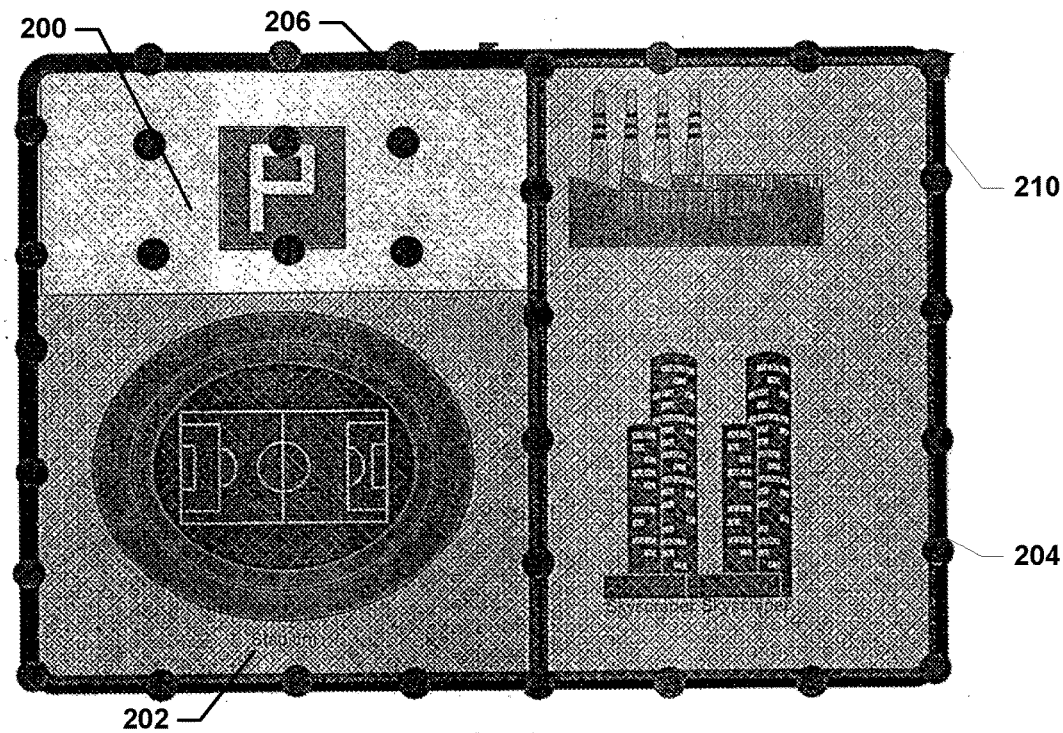
FIG. 2A is an aerial image of a city with dots showing possible locations for vehicles, according to an embodiment of the present invention.
Figure 2B:
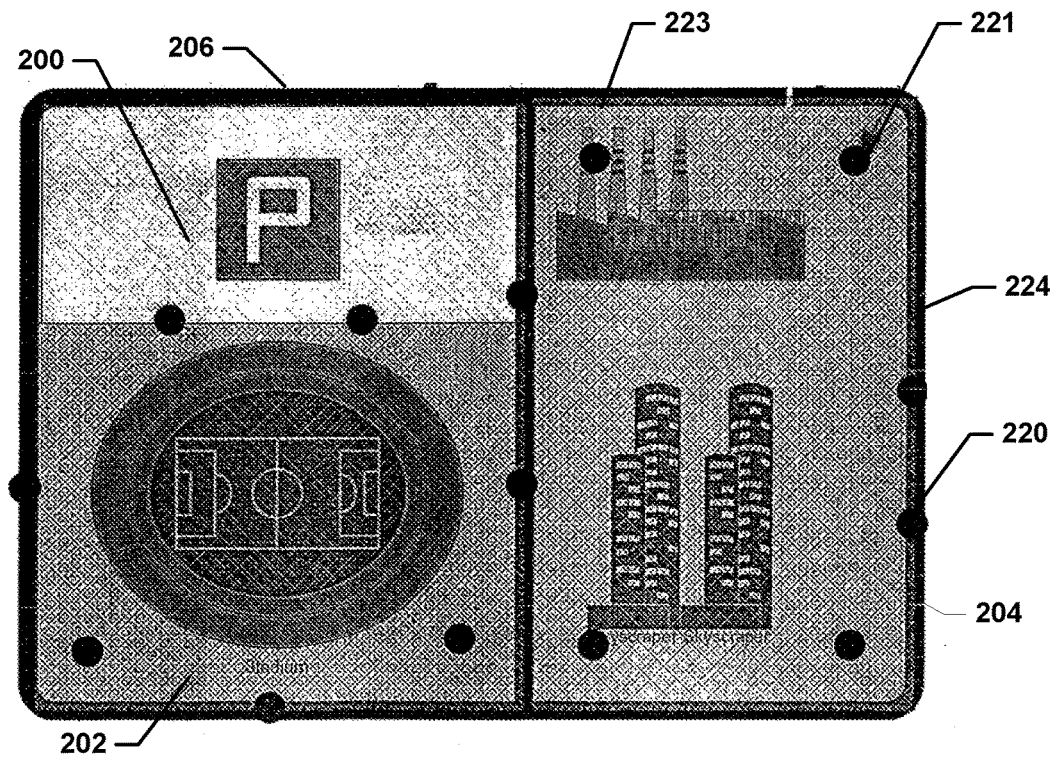
FIG. 2B is an aerial image of a city with dots showing estimated locations of access points based on vehicle harvesting, according to an embodiment of the present invention.

An example of collector devices operated in one or more vehicles is shown in Applicant's FIGS. 2A and 2B. Specifically, FIG. 2A shows a parking lot 200, a sports stadium 202, and a city area 204. The plurality of dots 210 in FIG. 2A show valid GNSS positions of a vehicle as it is traveling on the various roadways 206 or in parking area 200. As the vehicle is traveling on roadways 206, or is in parking area 200, the collector device within the vehicle is receiving signals from the APs (not shown). These signals are then reported to centralized server 103, where positioning information such as the locations of the APs are computed. For simplicity sake, the following examples with respect to the figures describe computing the locations of the APs as the positioning information. However, it is noted that positioning information computed by the server may be RF fingerprints of the APs or other positioning information.

Shown in FIG. 2B is a solution for an estimate of the AP locations computed by the server. Specifically, the dots in FIG. 2B show the estimated locations of the APs. It is evident from FIG. 2B, that since the collector device was collecting information from inside the vehicle on the roadways, the estimated AP locations are biased towards the roadways (i.e., the APs are estimated as being on or close to the roadway). Some of the APs 221 which are located between two adjacent roadways may have their location estimated further away from the roadway depending on if the server is utilizing a centroid solution (i.e., signals from the same AP are measured on two adjacent roadways 223 and 224). Even though some of the APs 221 may not be located exactly on the roadway, they are still biased towards the roadway (i.e. they are close to the roadway).

Figure 3A:
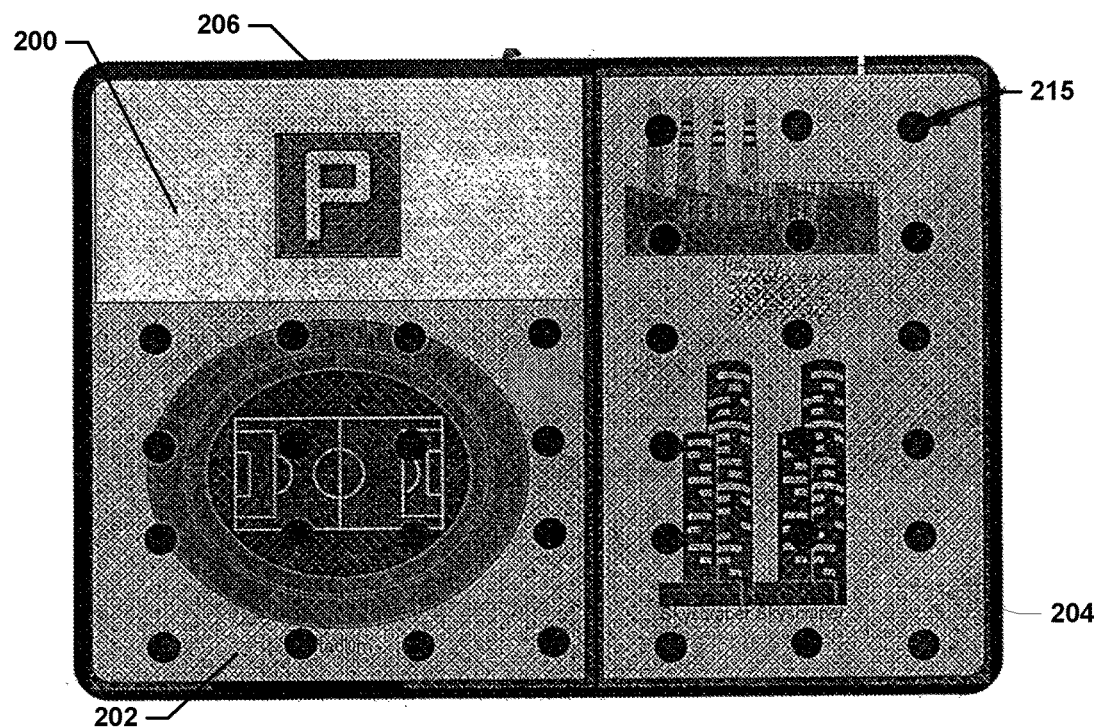
FIG. 3A is an aerial image of a city with dots showing possible locations for pedestrians, according to an embodiment of the present invention.

In another example, one or more pedestrians (not shown) may be holding collector devices 100 as the pedestrians walk through stadium area 202 and city area 204. This is shown in FIG. 3A where the collector device being held by the pedestrian may have various valid GNSS locations as shown by dots 215. It is noted that the dots do not appear on the roadway or in parking area 206 since the pedestrian typically does not travel through these areas on foot. Similar to the example in FIG. 2A, the collector device 100 is collecting signals from various APs in stadium area 202 and city area 204 along with their associated GNSS locations. These signals and GNSS locations are then sent to centralized server 103 which estimates the locations of the APs.

Figure 3B:
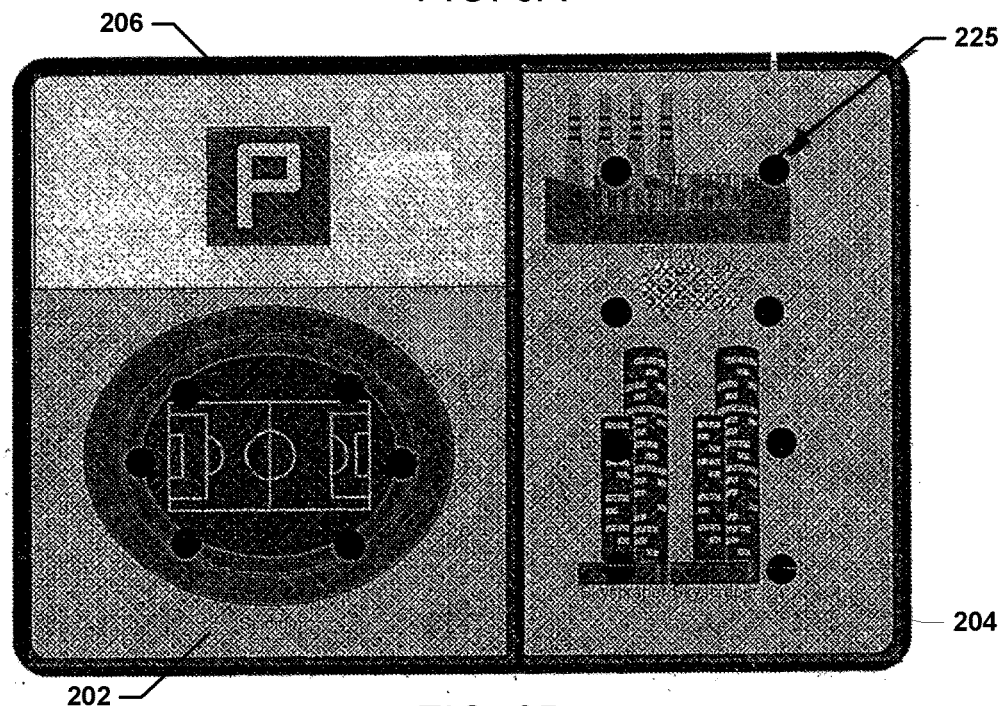
FIG. 3B is an aerial image of a city with dots showing estimated locations of access points based on pedestrian harvesting, according to an embodiment of the present invention.

Shown in FIG. 3B is an example of centralized server estimating the AP locations. Specifically, the plurality of dots 225 in stadium area 202 and city area 204 are the estimated locations of the APs. It is evident from FIG. 3B, that the estimated AP locations are biased towards the pedestrian areas in stadium area 202 and city area 204 (i.e., they are not located on the roadway or in the parking area 200).

Although collector device in the vehicle and the collector device with the pedestrian both receive signals from the same APs, the AP locations are estimated differently by the server depending on the environmental context in which the signals were received (i.e., by vehicle or by pedestrian). Thus, a particular estimated AP location may be biased towards the roadway if the AP signals are received in a vehicle or the same estimated AP location may be biased towards a pedestrian area if the signals are received by a pedestrian walking on a walkway.

Since the signals received by the collector device are biased due to the environmental context of the collector device, it may be beneficial to use this bias in a positive way to estimate the AP locations such that they are biased towards specific environments (e.g. modes of travel). Specifically, the collector device 100 may receive signals from the AP and determine its environmental context (e.g. pedestrian travel, vehicle travel, etc.). The signals received from the AP may then be associated with this environmental context.

The collector device may, for example, determine via various sensors (e.g., accelerometers, GNSS receivers, etc.) its motion (i.e. how it is traveling). Specifically, collector device 100 can determine if it is being carried by a pedestrian who is walking on a walkway, or if it is being driven in a vehicle on a roadway. The determination of whether the collector device is on a walkway, or on a roadway can be performed based on the detected velocity of the collector device and/or the acceleration of the collector device or other physical environmental features, such as stairs or an elevator in a building, that may be detectable by the sensor.

The collector device may also have access to maps and could potentially position itself on a particular roadway or walkway or street on a map. Thus, in one example, the collector device can report the characteristics of the AP signals along with an indication that the collector device is located in a vehicle on a specific roadway traveling at a specific velocity in a specific direction. A similar example can be determined by the collector device for a pedestrian walking on a specific walkway. The collector device can also determine if the signals are being received from an indoor area or an outdoor area. In general, this environmental context information is associated with the signals received from the AP and with an estimated absolute/relative position of the collector device with respect to the AP where the signals where received. This associated information is then transmitted to centralized server 103 for processing.

Centralized server 103 receives the AP harvested information, the collector device position, and the environmental context information. Centralized server 103 may then utilize the AP information with other AP information that has similar associated environmental context information.

For example, if N collector devices are traveling in vehicles on roadways, then the AP harvested information from these N collector devices may be utilized together since they have the same environmental context. Specifically, the centralized server 103 can utilize AP harvested information with similar environmental contexts to better aid in collector device positioning (i.e. estimate AP locations that are purely biased from specific environmental contexts).

Similarly, AP harvested information received by the server having an environmental context of a pedestrian walking on a walkway may also be combined with other pedestrian AP harvested information to estimate AP locations that are differently biased than the vehicle solution. Thus, centralized server 103 may have different AP location estimates depending on the different environmental contexts (i.e., an AP may have a first location associated with a first environmental context and different second location associated with a different environmental context). The server may then store these different estimated AP locations as distinct solutions (e.g. vehicle solution and pedestrian solution) in the server memory.

It should also be noted that centralized server 103 may be split into multiple servers that service distinct environmental contexts. For example, a first server may be utilized by collector devices traveling via pedestrian means, whereas a second server may be utilized by collector devices traveling via vehicle means, thereby separating distinct AP solutions based on their respective environmental contexts.

It should also be noted that there could be a third solution and/or server that computes the AP locations based on a combination of both the pedestrian collector devices, and the vehicle collector devices. This combination may be beneficial for collector devices that are transitioning between different environment contexts. For example, assuming the collector device is transitioning from traveling in a vehicle to walking on a crosswalk (i.e., the user parks the car and then begins walking), it may be beneficial to have a combined solution in this particular transition area rather than an abrupt switch between the vehicle solution and the pedestrian solution.

After centralized server 103 computes the locations of the APs, it may then utilize these locations during future requests from other collector devices attempting to estimate their relative positions. For example, various collector devices traveling on the roadways, or in the pedestrian areas may send a message to centralized server 103 requesting AP locations. In the example system, the requests from the collector devices may also include the current environmental context of the collector device (e.g., whether the collector device is in a vehicle or on a pedestrian). The server may then respond accordingly so that the AP locations computed with respect to the pedestrian mode of travel and the vehicle mode of travel may be sent to the appropriate collector devices having similar environmental contexts.

For example, if a collector device traveling in a vehicle sends a request to centralized server 103, then centralized server 103 may respond with the AP locations that were computed by other collector devices traveling in vehicles. Similarly, if the centralized server 103 receives a request from a collector device traveling with a pedestrian, then the server may respond with the AP locations that were computed by other pedestrian collector devices. This ensures that the collector devices traveling via vehicle may receive AP locations that are biased towards the roadways, whereas pedestrian collector devices, may receive APs locations biased towards the pedestrian areas. Thus, the biased solutions between the pedestrian and the vehicle may be distributed properly according to the environment context of the requesting device. The server may perform such an operation by comparing the environmental context received in the request with the environmental context associated with the AP locations stored in memory.

It is noted that in an alternative embodiment, the collector device may not transmit its environmental context to the server during the positioning request. In this example, the server may respond to a request by transmitting information biased to a variety of possible environmental contexts. The collector may then locally choose one of the solutions that best suits its current environmental context. This embodiment may be beneficial in situations where the collector device is transitioning between different environments (e.g. from vehicle travel to pedestrian travel). The collector device can simply switch between the solutions during the transition without having to re-connect with the server.

It is also noted that the positioning information may be stored locally on the collector device for long periods of time. This positioning information may have been previously computed by the server in the past (e.g. hours, days or months before the collector device uses it). The collector device can then access this locally stored positioning information based on its current environmental context (i.e. the collector device can extract position information from local memory that best suits its environment).

Figure 4A:
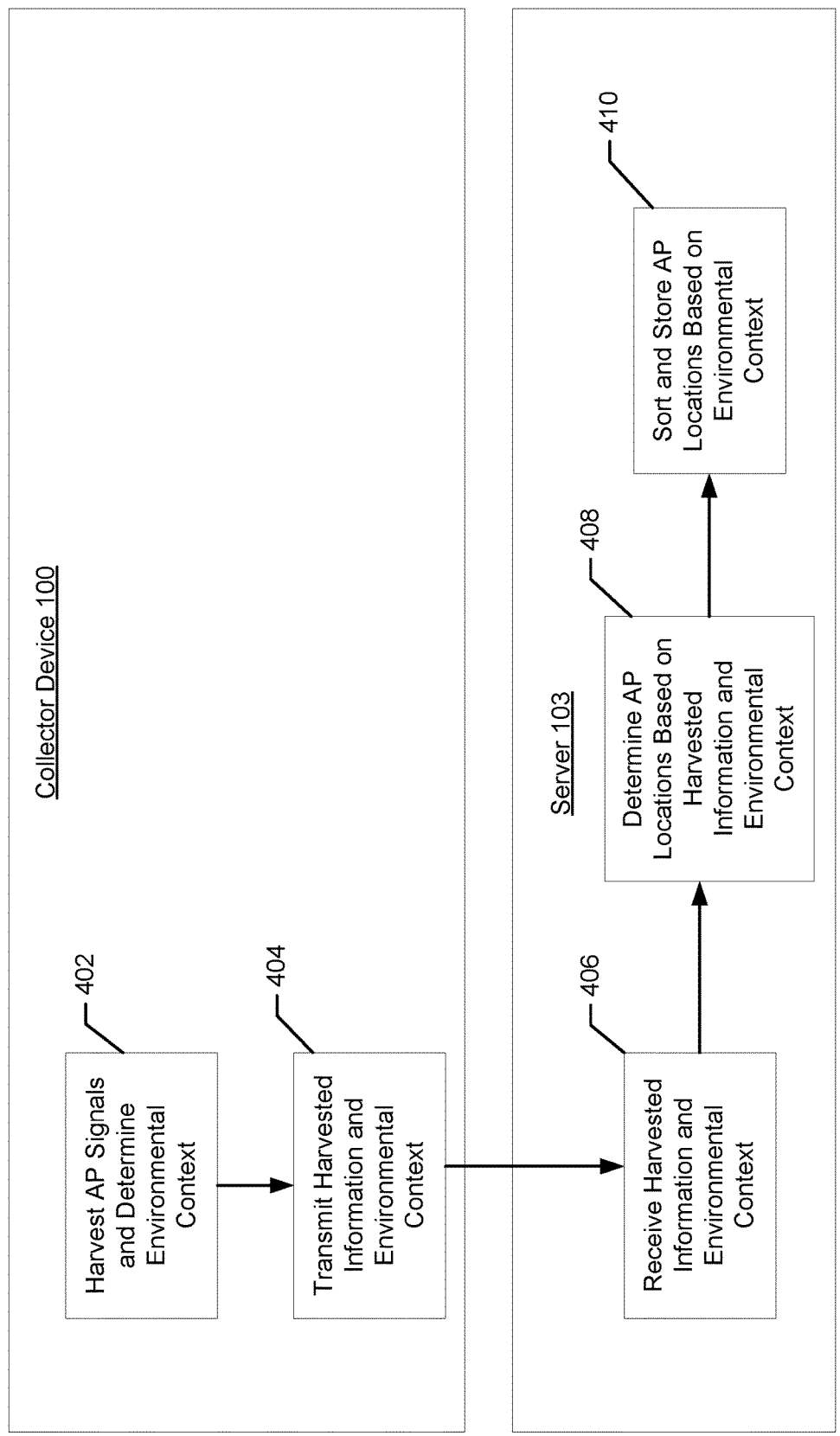
FIG. 4A is a combination flow chart and block diagram showing the harvesting and sorting/storing procedure of the mobile device and server, according to an embodiment of the present invention.

Shown in FIG. 4A is a functional flow chart/block diagram of the communication between the collector device and a centralized server during the harvesting process. Specifically, collector device 100 is able to harvest the transmission signals from the APs, and utilize its sensors to determine its environmental context when receiving the AP signals (step 402). Collector device 100 then transmits the harvested information along with the associated environmental context (step 404). The harvested information and environmental context of collector device 100 is then received by centralized server 103 (step 406). Centralized server 103 then estimates the AP locations based on the harvested information from the collector device and other harvested information from other collector devices that have similar environmental contexts (step 408).

For example, a first collector device that receives signals from a vehicle and a second collector device that also receives signals from a vehicle may have their harvested information aggregated by server 103 in step 408 in order to estimate the locations of the APs. This harvested information is able to be aggregated since both the first and second collector devices have similar environmental context (i.e., they are both driving in a vehicle). The centralized server device 103 is then able to sort and store the AP locations based on specific environmental context (step 410). For example, the estimates of the AP locations for collectors in a vehicle would be stored separately from estimated AP locations of collector devices that are located on a pedestrian who is walking.

Figure 4B:
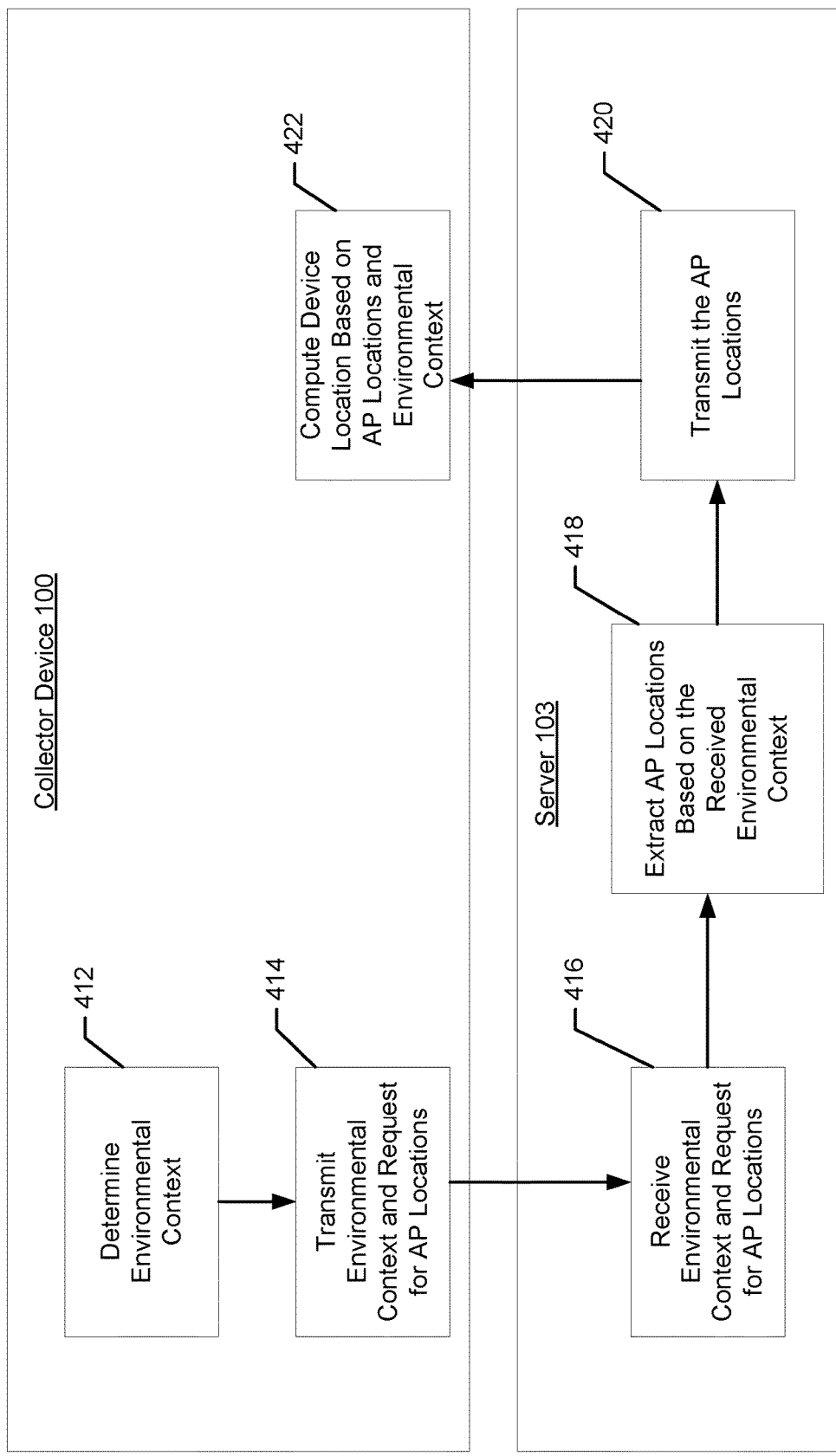
FIG. 4B is a combination flow chart and block diagram showing the access point location requesting and extracting procedure of the mobile device and server, according to an embodiment of the present invention.

FIG. 4B shows a functional flow chart/block diagram of the communication between collector device 100 and centralized server 103 during a request where collector device 100 is trying to estimate its location (i.e., after the signals have already been harvested). Specifically, collector device 100 may utilize its sensors or GNSS receiver to determine its environmental context (step 412). Collector device 100 may then transmit this environmental context along with a message requesting AP location information (step 414). Centralized server 103 then receives the environmental context information and the request for the AP locations (step 416). Centralized server 103 extracts the already estimated AP locations based on the received environmental context.

For example, centralized server 103 may compare the received environmental context from collector device 100 with the environmental context that is associated with the already estimated AP locations stored in memory (step 418). If the environmental contexts match, then the AP locations are extracted from memory. The centralized server 103 may then transmit the extracted AP locations back to the collector device (step 420). Collector device 100 may then receive the AP locations and compute its own location based on the AP locations, the harvested signals, and the environmental context (step 422).

Although the examples above with respect to FIGS. 2A, 2B, 3A, 3B, 4A and 4B are directed to estimating AP locations being used as positioning information, it is contemplated that other alternative positioning techniques such as RF fingerprinting may also be used. In RF fingerprinting, for example, the RF signatures of the APs are harvested and transmitted to the server along with the environmental context and the absolute/relative location of the collector device. RF signatures of multiple collector devices may be processed (e.g. averaged/combined/interpolated) by the server to determine an overall RF signature for any given location.

In response to a request (including the current RF signature) from a collector device, the server may then determine a best match between the pre-computed RF signatures and the current RF signature of the requesting collector device. The location of the matched RF signature may then be used to estimate the location of the requesting collector device.

It is noted that in another example, the RF signatures can be locally stored and computed by the collector device without the need of the server. It is also noted that other positioning techniques (other than estimating AP locations and RF fingerprinting as described above) could also be supplemented using the environmental context information.

In general, both the collector devices and the server device utilize the environmental context in order to calculate a more accurate positioning solution. The environmental context of the collector devices is associated with the harvested information. This allows server 103 to aggregate harvested information from various collector devices that have similar environmental contexts, and therefore similar biases. These biased solutions may then later be utilized during a request from further collector devices so that the appropriate biased solution is selected for a given request.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method for harvesting information from a plurality of radio frequency (RF) sources, the method comprising:
    receiving, by a first collector device, RF signals from the RF sources to produce first harvesting information;
    determining, by the first collector device, environmental context information including at least one of the first collector device traveling by pedestrian travel or vehicle travel and a position of the first collector device;
    associating, by the first collector device, the environmental context information with the first harvesting information and the position of the first collector device; and
    transmitting, by the first collector device, the first harvesting information, position of the first collector device and the associated environmental context information to a server device.

2. The method of claim 1, wherein the environmental context information is determined by sensors integrated in the first collector device, the sensors including at least one of an accelerometer, a global navigation satellite system (GNSS) receiver, a gyroscope or a compass.

3. The method of claim 1, wherein the first collector device utilizes a map when determining the environmental context information, such that the environmental context information further includes at least one of an identified walkway or roadway where the first collector device is traveling.

4. The method of claim 1, wherein the first collector device associates at least one of signal strength or propagation time of the RF signals with the environmental context information.

5. The method of claim 1, wherein the first collector device determines the environmental context information based at least in part on a motion of the first collector device, the motion including at least one of velocity, acceleration or direction.

6. The method of claim 1, further comprising:
    receiving, by a second collector device, RF signals from the RF sources to produce second harvesting information;
    determining, by the second collector device, second environmental context information;
    associating, by the second collector device, the second environmental context information with the second harvesting information; and
    transmitting, by the second collector device, the second harvesting information and the second associated environmental context information to the server device.

7. A collector device for harvesting information from a plurality of radio frequency (RF) sources comprising:
    a processor configured with processor-executable instructions to:
        receive RF signals from the RF sources to produce the harvesting information;
        determine environmental context information including at least one of the collector device traveling by pedestrian travel or vehicle travel and a position of the collector device;
        associate the environmental context information with the harvesting information and the position of the collector device; and
        transmit the harvesting information, position of the collector device and the associated environmental context information to a server device.

8. The collector device of claim 7, further comprising:
    sensors coupled to the processor and including at least one of an accelerometer, a global navigation satellite system (GNSS) receiver, a gyroscope or a compass, and configured to:
        determine the environmental context information.

9. The collector device of claim 7, wherein the processor of the collector device is configured to utilize a map when determining the environmental context information, such that the environmental context information further includes at least one of an identified walkway or roadway where the collector device is traveling.

10. The collector device of claim 7, wherein the processor of the collector device is configured to associate at least one of signal strength or propagation time of the RF signals with the environmental context information.

11. The collector device of claim 7, wherein the processor of the collector device is configured to determines the environmental context information based at least in part on a motion of the collector device, the motion including at least one of velocity, acceleration or direction.

12. A collector device for harvesting information from a plurality of radio frequency (RF) sources comprising:
    means for receiving RF signals from the RF sources to produce the harvesting information;
    means for determining environmental context information including at least one of the collector device traveling by pedestrian travel or vehicle travel and a position of the collector device;
    means for associating the environmental context information with the harvesting information and the position of the collector device; and
    means for transmitting the harvesting information, position of the collector device and the associated environmental context information to a server device.

13. The collector device of claim 12, wherein the means for determining environmental context information include at least one of an accelerometer, a global navigation satellite system (GNSS) receiver, a gyroscope or a compass.

14. The collector device of claim 12, wherein the environmental context information further includes at least one of the collector device traveling by pedestrian travel or vehicle travel.

15. The collector device of claim 12, further comprising means for associating at least one of signal strength or propagation time of the RF signals with the environmental context information.

16. The collector device of claim 12, wherein the means for determining the environmental context information further comprises means for determining environmental context information based at least in part on a motion of the collector device, the motion including at least one of velocity, acceleration or direction.

* * * * *